(12) United States Patent
Khillar et al.

(10) Patent No.: US 11,216,482 B2
(45) Date of Patent: Jan. 4, 2022

(54) SYSTEMS AND METHODS FOR ACCESS TO MULTI-TENANT HETEROGENEOUS DATABASES

(71) Applicant: Citrix Systems, Inc., Fort Lauderdale, FL (US)

(72) Inventors: Shiv Prasad Khillar, Bengaluru (IN); Saifulla Shaik, Bengaluru (IN)

(73) Assignee: CITRIX SYSTEMS, INC., Fort Lauderdall, FL (US)

( * ) Notice: Subject to any disclaimer, the term of this patent is extended or adjusted under 35 U.S.C. 154(b) by 336 days.

(21) Appl. No.: 16/381,362

(22) Filed: Apr. 11, 2019

(65) Prior Publication Data
US 2020/0327140 A1 Oct. 15, 2020

(51) Int. Cl.
| | | |
|---|---|---|
| *G06F 16/00* | (2019.01) | |
| *G06F 16/27* | (2019.01) | |
| *G06F 16/2455* | (2019.01) | |
| *G06F 16/22* | (2019.01) | |

(52) U.S. Cl.
CPC .......... *G06F 16/27* (2019.01); *G06F 16/2282* (2019.01); *G06F 16/24552* (2019.01)

(58) Field of Classification Search
CPC ...... G06F 16/252; G06F 16/27; G06F 16/256; G06F 16/2282; G06F 16/24552
See application file for complete search history.

(56) References Cited

U.S. PATENT DOCUMENTS

| | | | |
|---|---|---|---|
| 8,326,876 B1* | 12/2012 | Venkataraman ........ | G06F 16/13 707/784 |
| 2012/0331016 A1* | 12/2012 | Janson .................... | G06F 16/25 707/809 |
| 2013/0081109 A1* | 3/2013 | Venkataraman ...... | G06F 16/252 726/4 |
| 2014/0067852 A1* | 3/2014 | Wong ................ | G06F 16/24552 707/769 |
| 2016/0070771 A1* | 3/2016 | Vermeulen .......... | G06F 11/3006 707/687 |
| 2016/0274940 A1* | 9/2016 | Birdsall ................ | G06F 16/245 |
| 2017/0364701 A1* | 12/2017 | Struttmann ......... | G06F 16/2282 |
| 2018/0048717 A1* | 2/2018 | De Lavarene .......... | H04L 67/14 |
| 2018/0083977 A1* | 3/2018 | Murugesan ............ | G06F 16/27 |
| 2018/0357237 A1* | 12/2018 | Balasubrahmanian ..................... | G06F 16/2365 |
| 2019/0065319 A1* | 2/2019 | Hellwege ............ | G06F 11/1435 |

(Continued)

*Primary Examiner* — Shiow-Jy Fan
(74) *Attorney, Agent, or Firm* — Foley & Lardner LLP (57) ABSTRACT

Systems and methods described herein provide heterogeneous access to tenant databases. A delegator intermediary to clients and tenant database receives a request from a client to perform a database related action. The request identifies a query type and tenant identifier. The tenant databases include a first tenant database of a first database type and a second tenant database of a second type. The delegator identifies a tenant database using the tenant identifier from the request. The delegator determines a database type corresponding to the identified tenant database. The delegator selects, from a plurality of drivers corresponding to respective database types, a driver based on a database type for the identified tenant database. The delegator establishes a database connection using the selected driver between the delegator and identified tenant database. The delegator uses the database connection for performing the database related action from the request.

20 Claims, 3 Drawing Sheets

(56) References Cited

U.S. PATENT DOCUMENTS

2019/0205459 A1* 7/2019 Busjaeger .............. G06F 16/27
2019/0312931 A1* 10/2019 Greenwood .......... G06F 16/951
2020/0250172 A1* 8/2020 Busjaeger ........... G06F 16/2365

* cited by examiner

SYSTEMS AND METHODS FOR ACCESS TO MULTI-TENANT HETEROGENEOUS DATABASES

FIELD OF THE DISCLOSURE

The present application generally relates to management of access to databases.

BACKGROUND

Various computing and client devices may access databases. Such client devices may access such databases to retrieve information/data stored thereon. Client devices may be limited to access particular types of databases. For instance, a client device may only access a database which the client device has a corresponding driver.

BRIEF SUMMARY

The present disclosure is directed towards systems and methods for providing heterogeneous access to a plurality of tenant databases of different types. Analytics services typically use various servers as databases. As one example, an analytics service may use Microsoft Structured Query Language (SQL) servers, PostgresSQL servers, and the like. Typically, one driver can only connect to one type of server (e.g., a Microsoft SQL Java Database Connectivity (JDBC) driver for connecting to the Microsoft SQL servers, PostgresSQL JDBC driver for connecting to the PostgresSQL server, and so forth). As such, enterprises typically use one type of server so that clients need only use one driver. While the enterprise may use or access multiple tenant databases, each of the tenant database may belong to the same type of tenant database (e.g., reside on the same server or same server type). Thus, while multitenancy may exist, typically the tenant databases are homogeneous.

According to the embodiments described herein, the present disclosure describes a delegator which provide for heterotenancy. The delegator is arranged intermediary to a plurality of clients and a plurality of tenant databases. The plurality of tenant databases may include a first tenant database of a first database type and a second tenant database of a second database type. The delegator receives a request from a client. The request is to perform a database related action and may identify a query type and tenant identifier. The delegator identifies a tenant database using the tenant identifier included in the request. The delegator identifies the tenant database for transmitting a second request to the tenant database. The delegator determines a database type corresponding to the identified tenant database. The delegator selects a driver corresponding to the database type for the identified tenant database from a plurality of drivers corresponding to respective database types. The delegator establishes a database connection between the delegator and identified tenant database using the selected driver for performing the database related action of the request.

The present technical solution provides a delegator which is configured for heterotenancy (e.g., multitenancy and heterogeneous tenant databases), and which be used or employed in various enterprises and environments. The delegator includes various types of drivers and configuration data to make, form, or otherwise establish a connection between the delegator and different types of tenant databases. The delegator may receive a request via a connection between the embodiments described herein may provide for the ability to perform database migrations. The client need not develop or configure drivers where new tenant databases of different types are introduced. Rather, a client only need one driver for establishing communication between the client and the delegator. The delegator may include or access multiple drivers for connecting to different types of tenant databases. Where a new type of tenant database is introduced, existing queries between the client and delegator may run and execute unaffected, as an administrator may update configurations of the delegator to integrate the new type of tenant database into the existing framework.

In some implementations, the delegator includes signature cache. The signature cache may be used by the delegator for storing various table metadata (e.g., characteristics or features) of the tenant databases. The delegator may store the table metadata in the cache until expiration of the database connection or alteration to a structure of a table corresponding to the table metadata. Such embodiments may expedite performance of various database related action at the tenant database by storing table metadata corresponding to the tenant database. Through storing table metadata, the delegator need not populate or otherwise retrieve tenant metadata at each instance the tenant database is accessed (which could slow performance). Rather, the delegator can use the table metadata stored in the cache for executing the database related actions.

The client may request and form a connection (such as a Hypertext Transmission Protocol/2 (HTTP/2) connection) to the delegator. The client may stream, communicate, or otherwise transmit a request including any queries to perform various database related actions to the delegator. The request may hold details of the SQL, parameters associated with a database connection, and tenant information. The request may indicate the query type and a tenant identifier. The request may various connection data corresponding to a database connection to the tenant database. The connection data may include a connection identifier (ID) (e.g., a connection string), login credentials corresponding to a user of the client (e.g., a username and/or password), a tenant identifier, a query type, a specific query, various placeholders and limits on return values, etc.

The delegator may receive the request from the client. The delegator may read, determine, or otherwise identify a tenant database corresponding to the request. The delegator may read data included in the request and perform a database lookup by matching tenant metadata from the request with tenant metadata stored or otherwise accessible by the delegator. The delegator may retrieve, fetch, or otherwise select an appropriate driver corresponding to a database type for the identified database. The delegator may retrieve, fetch or otherwise select configuration details corresponding to a database connection to the target database. The delegator may form, generate, make, or otherwise establish the database connection using the configuration details (e.g., username, password, connection string, etc.) and selected driver. In some implementations, the database connection is one of several database connections which may be used within a connection pool. The database connections may be subsequently used at various points in time.

In some embodiments, the delegator may include a driver which uses table metadata for creating a prepared statement in accordance with the request. The table metadata may be unique for each SQL. The table metadata may also be referred to as signature data. The delegator may create table metadata for each SQL and store the table metadata in a cache. The delegator may clear the cache upon expiration or alteration of the corresponding tenant database. The delegator may use the cached table metadata for expediting performance of the database related functions.

According to one aspect, this disclosure is directed to a method for providing heterogeneous access to a plurality of tenant databases of different types. The method includes receiving, by a delegator intermediary to a plurality of clients and a plurality of tenant databases, from a client of the plurality of clients, a request to perform a database related action. The request identifies a query type and a tenant identifier. The plurality of tenant databases includes one or more first tenant databases of a first database type and one or more second tenant databases of a second database type. The method includes identifying, by the delegator, using the tenant identifier included in the request, a tenant database for transmitting a second request to the tenant database. The method includes determining, by the delegator, a database type corresponding to the identified tenant database. The method includes selecting, from a plurality of drivers corresponding to respective database types, a driver based on the database type for the identified tenant database. The method includes establishing, by the delegator using the selected driver, a database connection between the delegator and the identified tenant database for performing the database related action of the request.

In some embodiments, the database related action includes a query for execution. The method may further include executing, by the delegator using the database connection, the query to retrieve data from the identified database. The method may further include generating, by the delegator, a statement based on the retrieved data. The method may further include transmitting, from the delegator to the client, the statement corresponding to the query. In some embodiments, the method further includes storing, by the delegator, table metadata corresponding to the identified database in a cache maintained by the delegator. In some embodiments, the delegator stores the table metadata in the cache until expiration of the database connection or alteration to a structure of a table corresponding to the table metadata.

In some embodiments, the method further includes establishing, between the delegator and the client, a client connection responsive to receiving a connection request from the client. The request to perform the database related action may be received via the client connection. In some embodiments, the database related action of the request is one of a plurality of database related actions of the request. The method may further include terminating, by the delegator, the client connection responsive to execution of each of the plurality of database related actions. In some embodiments, the client connection is a HyperText Transmission Protocol/2 (HTTP/2) connection via which the delegator receives a plurality of requests including the request.

In some embodiments, the delegator establishes the database connection between the delegator and the identified tenant database for performing the database related action of the request using the selected driver, log-in credentials associated with a user of the client, and a connection string from the request. In some embodiments, the identified database is a first tenant database having the first database type, and the request is a request for connection to the first tenant database and a second tenant database having the second database type. In some embodiments, the database connection is a first database connection. The method may further include establishing, by the delegator, a second database connection between the delegator and the second tenant database using a second driver corresponding to the second database type for the second tenant database. The first database connection and second database connection may be connections within a connection pool between the delegator and the plurality of databases.

According to another aspect, this disclosure is directed to a system for providing heterogeneous access to a plurality of tenant databases of different types. The system includes a delegator arranged intermediary to a plurality of clients and a plurality of database servers configured to be communicably coupled to the plurality of clients and the plurality of servers. The delegator may be configured to receive, from a client of the plurality of clients, a request to perform a database related action. The request may identify a query type and a tenant identifier. The plurality of tenant databases may include one or more first tenant databases of a first database type and one or more second tenant databases of a second database type. The delegator may be configured to identify, using the tenant identifier included in the request, a tenant database for transmitting a second request to the tenant database. The delegator may be configured to determine a database type corresponding to the identified tenant database. The delegator may be configured to select, from a plurality of drivers corresponding to respective database types, a driver based on the database type for the identified tenant database. The delegator may be configured to establish, using the selected driver, a database connection between the delegator and the identified tenant database for performing the database related action of the request.

In some embodiments, the database related action includes a query for execution. The delegator may be configured to execute, using the database connection, the query to retrieve data from the identified database. The delegator may be configured to generate a statement based on the retrieved data. The delegator may be configured to transmit, from the delegator to the client, the statement corresponding to the query. In some embodiments, the delegator is further configured to store table metadata corresponding to the identified database in a cache maintained by the delegator. In some embodiments, the delegator stores the table metadata in the cache until expiration of the database connection or alteration to a structure of a table corresponding to the table metadata.

In some embodiments, the delegator is further configured to establish, between the delegator and the client, a client connection responsive to receiving a connection request from the client. The request to perform the database related action may be received via the client connection. In some embodiments, the database related action of the request is one of a plurality of database related actions of the request. The delegator may be further configured to terminate the client connection responsive to execution of each of the plurality of database related actions. In some embodiments, the client connection is a HyperText Transmission Protocol/2 (HTTP/2) connection via which the delegator receives a plurality of requests including the request.

In some embodiments, the delegator establishes the database connection between the delegator and the identified tenant database for performing the database related action of the request using the selected driver, log-in credentials associated with a user of the client, and a connection string from the request. In some embodiments, the identified database is a first tenant database having the first database type, and the request is a request for connection to the first tenant database and a second tenant database having the second database type. In some embodiments, the database connection is a first database connection. The delegator may be further configured to establish a second database connection between the delegator and the second tenant database using a second driver corresponding to the second database type for the second tenant database. The first database connection and second database connection may be connections within a connection pool between the delegator and the plurality of databases.

BRIEF DESCRIPTION OF THE FIGURES

The foregoing and other objects, aspects, features, and advantages of the present solution will become more apparent and better understood by referring to the following description taken in conjunction with the accompanying drawings, in which.

The features and advantages of the present solution will become more apparent from the detailed description set forth below when taken in conjunction with the drawings, in which like reference characters identify corresponding elements throughout. In the drawings, like reference numbers generally indicate identical, functionally similar, and/or structurally similar elements.

DETAILED DESCRIPTION

For purposes of reading the description of the various embodiments below, the following descriptions of the sections of the specification and their respective contents may be helpful:

Section A describes a computing environment which may be useful for practicing embodiments described herein.

Section B describes systems and methods for managing notifications.

A. Computing Environment

Prior to discussing the specifics of embodiments of the systems and methods detailed herein in Section B, it may be helpful to discuss the computing environments in which such embodiments may be deployed.

Figure 1:
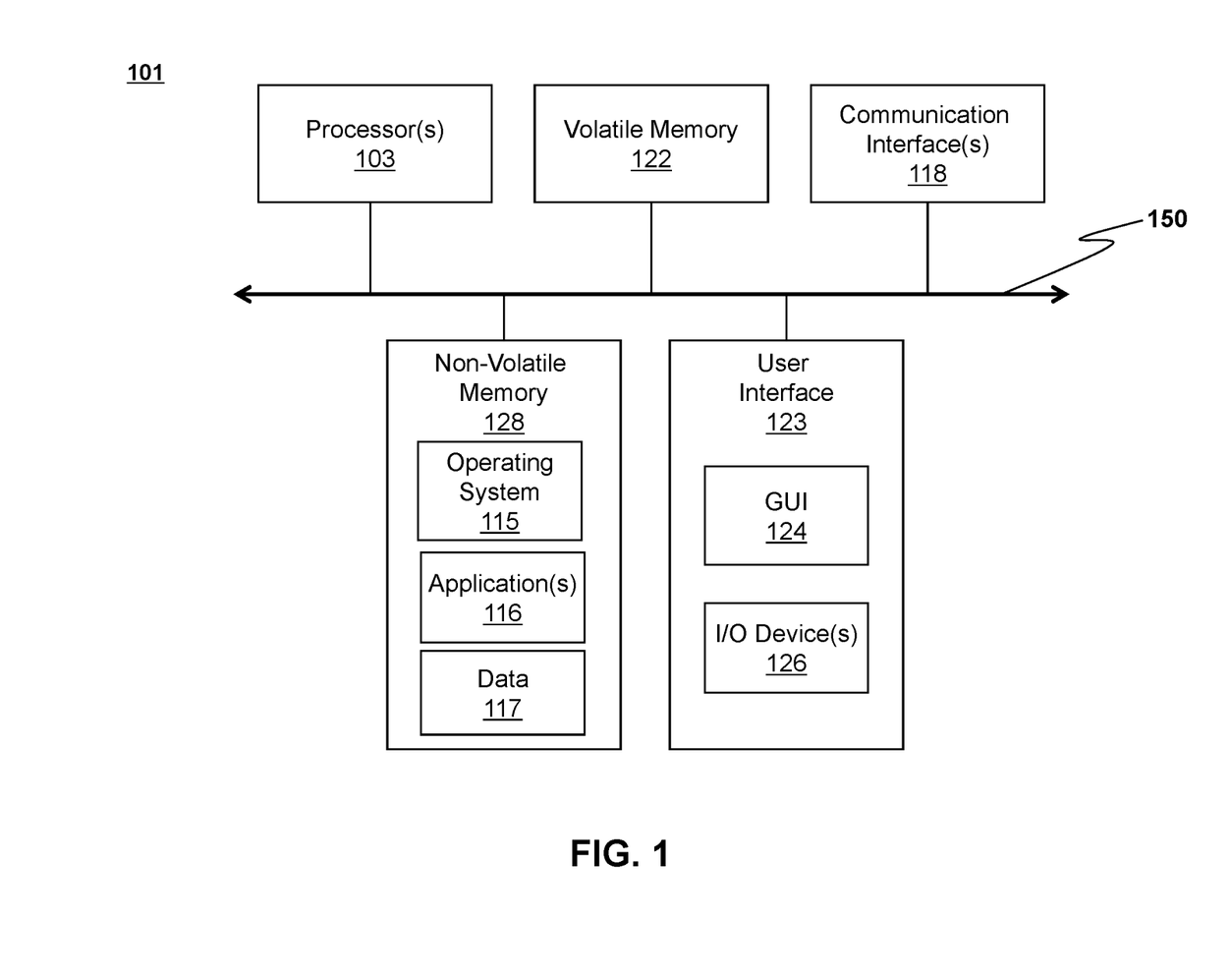
FIG. 1 is a block diagram of embodiments of a computing device.

As shown in FIG. 1, computer 101 may include one or more processors 103, volatile memory 122 (e.g., random access memory (RAM)), non-volatile memory 128 (e.g., one or more hard disk drives (HDDs) or other magnetic or optical storage media, one or more solid state drives (SSDs) such as a flash drive or other solid state storage media, one or more hybrid magnetic and solid state drives, and/or one or more virtual storage volumes, such as a cloud storage, or a combination of such physical storage volumes and virtual storage volumes or arrays thereof), user interface (UI) 123, one or more communications interfaces 118, and communication bus 150. User interface 123 may include graphical user interface (GUI) 124 (e.g., a touchscreen, a display, etc.) and one or more input/output (I/O) devices 126 (e.g., a mouse, a keyboard, a microphone, one or more speakers, one or more cameras, one or more biometric scanners, one or more environmental sensors, one or more accelerometers, etc.). Non-volatile memory 128 stores operating system 115, one or more applications 116, and data 117 such that, for example, computer instructions of operating system 115 and/or applications 116 are executed by processor(s) 103 out of volatile memory 122. In some embodiments, volatile memory 122 may include one or more types of RAM and/or a cache memory that may offer a faster response time than a main memory. Data may be entered using an input device of GUI 124 or received from I/O device(s) 126. Various elements of computer 101 may communicate via one or more communication buses, shown as communication bus 150.

Computer 101 as shown in FIG. 1 is shown merely as an example, as clients, servers, intermediary and other networking devices and may be implemented by any computing or processing environment and with any type of machine or set of machines that may have suitable hardware and/or software capable of operating as described herein. Processor(s) 103 may be implemented by one or more programmable processors to execute one or more executable instructions, such as a computer program, to perform the functions of the system. As used herein, the term "processor" describes circuitry that performs a function, an operation, or a sequence of operations. The function, operation, or sequence of operations may be hard coded into the circuitry or soft coded by way of instructions held in a memory device and executed by the circuitry. A "processor" may perform the function, operation, or sequence of operations using digital values and/or using analog signals. In some embodiments, the "processor" can be embodied in one or more application specific integrated circuits (ASICs), microprocessors, digital signal processors (DSPs), graphics processing units (GPUs), microcontrollers, field programmable gate arrays (FPGAs), programmable logic arrays (PLAs), multi-core processors, or general-purpose computers with associated memory. The "processor" may be analog, digital or mixed-signal. In some embodiments, the "processor" may be one or more physical processors or one or more "virtual" (e.g., remotely located or "cloud") processors. A processor including multiple processor cores and/or multiple processors multiple processors may provide functionality for parallel, simultaneous execution of instructions or for parallel, simultaneous execution of one instruction on more than one piece of data.

Communications interfaces 118 may include one or more interfaces to enable computer 101 to access a computer network such as a Local Area Network (LAN), a Wide Area Network (WAN), a Personal Area Network (PAN), or the Internet through a variety of wired and/or wireless or cellular connections.

In described embodiments, the computing device 101 may execute an application on behalf of a user of a client computing device. For example, the computing device 101 may execute a virtual machine, which provides an execution session within which applications execute on behalf of a user or a client computing device, such as a hosted desktop session. The computing device 101 may also execute a terminal services session to provide a hosted desktop environment. The computing device 101 may provide access to a computing environment including one or more of: one or more applications, one or more desktop applications, and one or more desktop sessions in which one or more applications may execute.

Additional details of the implementation and operation of network environment, computer 101 and client and server computers may be as described in U.S. Pat. No. 9,538,345, issued Jan. 3, 2017 to Citrix Systems, Inc. of Fort Lauderdale, Fla., the teachings of which are hereby incorporated herein by reference.

B. Systems and Methods for Providing Heterogeneous Access to a Plurality of Tenant Databases of Different Types The present disclosure is directed towards systems and methods for providing heterogeneous access to a plurality of tenant databases of different types. Analytics services typically use various servers as databases. As one example, an analytics service may use Microsoft Structured Query Language (SQL) servers, PostgresSQL servers, and the like. Typically, one driver can only connect to one type of server (e.g., a Microsoft SQL Java Database Connectivity (JDBC) driver for connecting to the Microsoft SQL servers, PostgresSQL JDBC driver for connecting to the PostgreSQL server, and so forth). As such, enterprises typically use one type of server so that clients need only use one driver. While the enterprise may use or access multiple tenant databases, each of the tenant database may belong to the same type of tenant database (e.g., reside on the same server or same server type). Thus, while multitenancy may exist, typically the tenant databases are homogeneous.

According to the embodiments described herein, the present disclosure describes a delegator which provide for heterotenancy. The delegator is arranged intermediary to a plurality of clients and a plurality of tenant databases. The plurality of tenant databases may include a first tenant database of a first database type and a second tenant database of a second database type. The delegator receives a request from a client. The request is to perform a database related action and may identify a query type and tenant identifier. The delegator identifies a tenant database using the tenant identifier included in the request. The delegator identifies the tenant database for transmitting a second request to the tenant database. The delegator determines a database type corresponding to the identified tenant database. The delegator selects a driver corresponding to the database type for the identified tenant database from a plurality of drivers corresponding to respective database types. The delegator establishes a database connection between the delegator and identified tenant database using the selected driver for performing the database related action of the request.

The present technical solution provides a delegator which is configured for heterotenancy (e.g., multitenancy and heterogeneous tenant databases), and which be used or employed in various enterprises and environments. The delegator includes various types of drivers and configuration data to make, form, or otherwise establish a connection between the delegator and different types of tenant databases. The delegator may receive a request via a connection between the embodiments described herein may provide for the ability to perform database migrations. The client need not develop or configure drivers where new tenant databases of different types are introduced. Rather, a client only need one driver for establishing communication between the client and the delegator. The delegator may include or access multiple drivers for connecting to different types of tenant databases. Where a new type of tenant database is introduced, existing queries between the client and delegator may run and execute unaffected, as an administrator may update configurations of the delegator to integrate the new type of tenant database into the existing framework.

In some implementations, the delegator includes signature cache. The signature cache may be used by the delegator for storing various table metadata (e.g., characteristics or features) of the tenant databases. The delegator may store the table metadata in the cache until expiration of the database connection or alteration to a structure of a table corresponding to the table metadata. Such embodiments may expedite performance of various database related action at the tenant database by storing table metadata corresponding to the tenant database. Through storing table metadata, the delegator need not populate or otherwise retrieve tenant metadata at each instance the tenant database is accessed (which could slow performance). Rather, the delegator can use the table metadata stored in the cache for executing the database related actions.

The client may request and form a connection (such as a Hypertext Transmission Protocol/2 (HTTP/2) connection) to the delegator. The client may stream, communicate, or otherwise transmit a request including any queries to perform various database related actions to the delegator. The request may hold details of the SQL, parameters associated with a database connection, and tenant information. The request may indicate the query type and a tenant identifier. The request may various connection data corresponding to a database connection to the tenant database. The connection data may include a connection identifier (ID) (e.g., a connection string), login credentials corresponding to a user of the client (e.g., a username and/or password), a tenant identifier, a query type, a specific query, various placeholders and limits on return values, etc.

The delegator may receive the request from the client. The delegator may read, determine, or otherwise identify a tenant database corresponding to the request. The delegator may read data included in the request and perform a database lookup by matching tenant metadata from the request with tenant metadata stored or otherwise accessible by the delegator. The delegator may retrieve, fetch, or otherwise select an appropriate driver corresponding to a database type for the identified database. The delegator may retrieve, fetch or otherwise select configuration details corresponding to a database connection to the target database. The delegator may form, generate, make, or otherwise establish the database connection using the configuration details (e.g., username, password, connection string, etc.) and selected driver. In some implementations, the database connection is one of several database connections which may be used within a connection pool. The database connections may be subsequently used at various points in time.

In some embodiments, the delegator may include a driver which uses table metadata for creating a prepared statement in accordance with the request. The table metadata may be unique for each SQL. The table metadata may also be referred to as signature data. The delegator may create table metadata for each SQL and store the table metadata in a cache. The delegator may clear the cache upon expiration or alteration of the corresponding tenant database. The delegator may use the cached table metadata for expediting performance of the database related functions.

Figure 2:
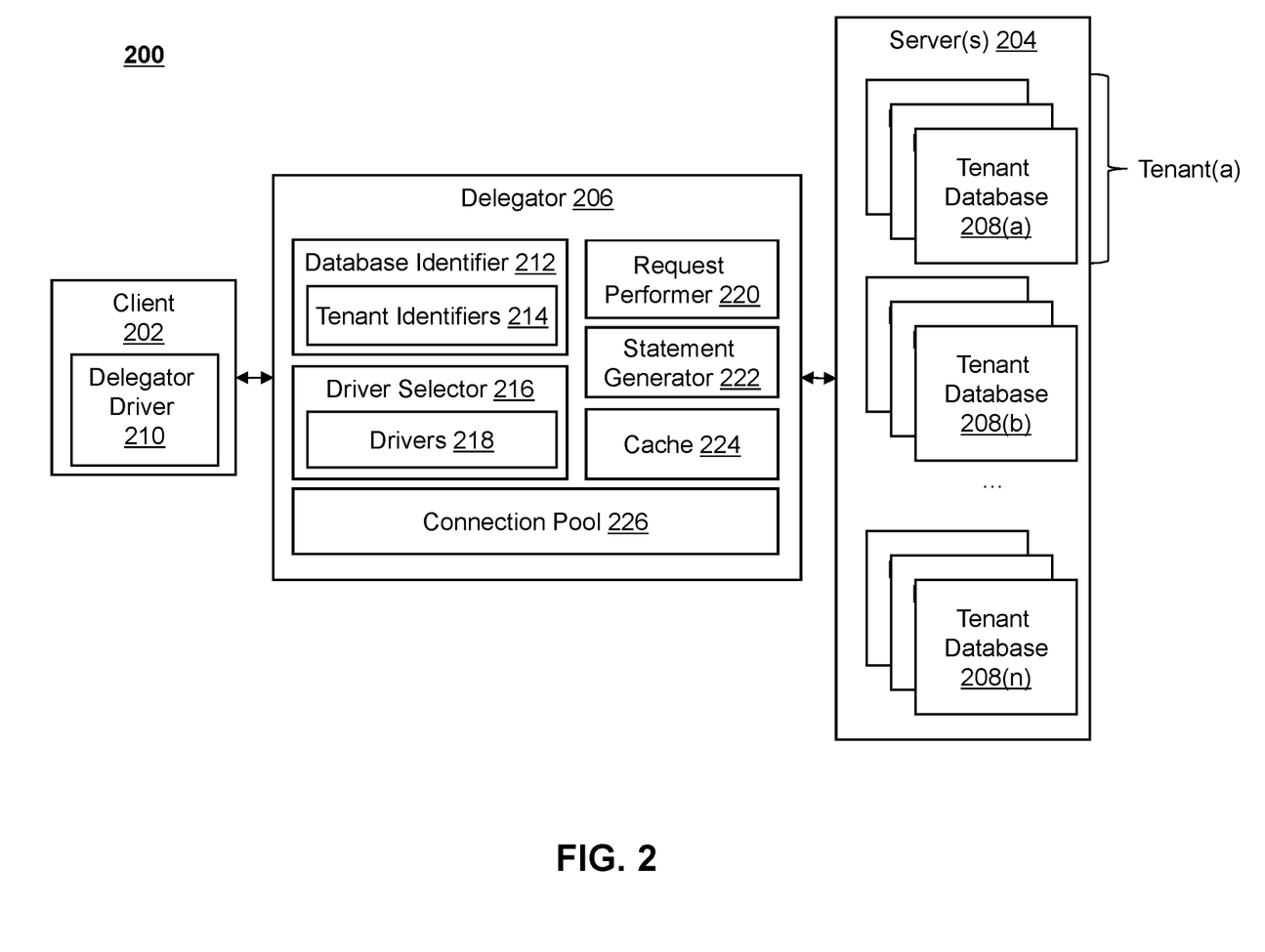
FIG. 2 is a block diagram of an example embodiment of a system for block diagram of a system 200 for providing heterogeneous access to a plurality of tenant databases of different types.

Referring now to FIG. 2, depicted a block diagram of a system 200 for providing heterogeneous access to a plurality of tenant databases of different types, according to an illustrative embodiment. The system 200 is shown to include a plurality of clients 202, a plurality of server(s) 204, and a delegator 206 intermediary to the clients 202 and servers 204. A client 202 may transmit a request to perform a database related action to the delegator 206. The delegator 206 may be configured to receive the request. The request may identify a query type and a tenant identifier. The delegator 206 may be configured to identity a tenant database 208 residing on one of the servers 204 based on the tenant identifier from the request. The delegator 206 may be configured to determine a database type for the identified tenant database 208. The delegator 206 may be configured to select a driver from a plurality of drivers corresponding to respective database types. The delegator 206 may be configured to select the driver based on the database type for the identified tenant database 208. The delegator 206 may be configured to establish a database connection between the delegator 206 and identified tenant database 208 for performing the database related action of the request.

The systems and methods of the present solution may be implemented in any type and form of device, including clients, servers and/or appliances described above with reference to FIG. 1. As referenced herein, a "server" may sometimes refer to any device in a client-server relationship, e.g., the server 204 in a handshake with the delegator 206 and/or clients 202. In some embodiments, the servers 204 may include different types of servers 204. For instance, the servers 204 may include Microsoft SQL servers 204, PostgresSQL servers 204, or other types of servers 204. The clients 202, servers 204, and/or delegator 206 may include or incorporate components and devices similar in some aspects to those described above with reference to FIG. 1. The present systems and methods may be implemented in any embodiments or aspects of the appliances or devices described herein. In some embodiments, the delegator 206 may be incorporated into, embodied on, or otherwise a component of an intermediary or other network device arranged between the client 202 and server(s) 204.

The client(s) 202 may be or include aspects, features, and components similar to the computing device 101 described above. The client(s) 202 may be or include, for instance, a desktop computer, a laptop computer, a smart phone or mobile device, a tablet, to name a few possibilities. The client(s) 202 may host, execute, deliver, or otherwise provide applications or resources to a user. For instance, the client(s) 202 may include a display or screen which renders a user interface including various icons for selecting applications. The client(s) 202 may be configured to request various information stored in tenant databases 208. Each client 202 may be associated with a particular tenant. "Tenant," as used herein, refers to an enterprise, group, organization, or subscriber to which a subset of information, data (or databases), services, or other resources are made available. Each client 202 may access resources (such as particular databases 208) corresponding to their tenant (also referred to herein as tenant databases 208).

Each client 202 may be configured to request a connection between the client 202 and the delegator 204. The clients 202 may be configured to communicate a connection request to the delegator 204. The connection request may be a request to form a client connection between the delegator 204 and client 202. The clients 202 may be configured to generate and communicate the connection request to the delegator 206 when the clients 202 are to access any tenant database(s) 208 associated with the tenant. The connection request may include, for instance, a client identifier, a user identifier (e.g., user name, password, employee number, or other alphanumerical code corresponding to a client 202 and/or user of the client 202). The client connection may be used by the client 202 for transmitting various requests to perform database related actions to the delegator 204, and used by the delegator 204 to transmit responses to the request, as described in greater detail below.

The clients 202 may be configured to generate a request for the delegator 206. The request may be a request to perform database related actions. In some embodiments, the database related action may be retrieving information from a tenant database 208. In some embodiments, the database related action may be writing information to the tenant database 208. In some embodiments, the database related action may be commands for the server 204 corresponding to the databases 208 to perform various information (e.g., commands to refresh a particular database 208, update a particular database 208, compare entries at two or more databases 208, etc.).

The clients 202 may be configured to structure the request to include various information corresponding to the tenant database(s) 208, the client 202, the tenant corresponding to the client 202, etc. In some embodiments, the request includes a query type and a tenant identifier. The query type may be or include a type of database related action to perform (e.g., a database read or write action, a database refresh action, a database updated action, a database comparison action, etc.). The tenant identifier may identify which tenant corresponds to the client 202 generating the request. The tenant identifier may be a tenant name, a tenant address, a pin or alphanumeric code associated with the tenant, etc. In some embodiments, the request includes a connection identifier. The connection identifier may be or include an alphanumeric code or string which is associated with the client connection between the client 202 and delegator 204.

In some embodiments, the request includes a query. The query may be a structured query in accordance with a Structured Query Language (SQL). In some embodiments, the client 202 may include or access a delegator driver 210. The delegator driver 210 may be or include any data structure, device, component, or interface designed or implemented to permit or provide communication between the client 202 and delegator 206. The delegator driver 210 may specify a structure for SQL requests. The delegator driver 210 may receive commands or prompts from other components of the client 202. The delegator driver 210 may translate, transform, or otherwise convert the commands into SQLs which are received and interpretable by the delegator 206. By providing the delegator driver 210 to the client 202, the client 202 accesses or uses one driver, rather than a plurality of drivers for different types of databases 208, as described in greater detail below.

As one non-limiting example, the client 202 may be configured to structure the request as follows:
{
"request":"executeQuery",
"connectionId": "0bcc539e-770f-416e-8a8c-ef3effa16b82",
"info": {tenant(a)},
"sql":"SELECT*FROM table where id=?",
"parameterValues":[{'1',Integer}],
"maxRowCount":100
}

As shown in the above example, the request may various connection data corresponding to a database connection to the tenant database. The connection data may include a connection identifier (ID) (e.g., a connection string) corresponding to a connection between the client 202 and the delegator 206, login credentials corresponding to a user of the client (e.g., a username and/or password), a tenant identifier corresponding to the tenant for the client 202, a database identifier corresponding to a particular tenant database 208, a query type of the query to be executed at the tenant database 208, a specific query, various placeholders and limits on return values, etc.

In some embodiments, the request may include a plurality of queries. In some embodiments, the clients 202 may be configured to communicate each query in separate requests. In each of these embodiments, the client 202 may be configured to communicate a plurality of queries to the delegator 206. In some embodiments, the queries may be for performing database related actions at different tenant databases 208. As one example, the client 202 may communicate one query for performing a database related action at a first tenant database 208a and another query for performing a database related action at a second tenant database 208b. In some embodiments, the first and second tenant database 208a and 208b may be different types of databases 208. For instance, the first tenant database 208a may reside on a first type of server 204 (e.g., a Microsoft SQL server) and the second tenant database 208b may reside on a second type of server 204 (e.g., a Postgres SQL server). Traditionally, clients 202 that access databases on two or more types of servers 204 would access two or more drivers for each respective server 204 type. According to the implementations described herein, the client 202 includes one driver (e.g., delegator driver 210) and is configured to access multiple types of servers 204 via the delegator 206.

The client 202 may be configured to receive results of the database related actions from the delegator 206. In some embodiments, results may be structured as a statement. As described in greater detail below, the delegator 206 may be configured to generate a statement following execution of the database related actions. The statement may include, for instance, data retrieved from the tenant database 208 indicated or otherwise identified in the request from the client 202. The delegator 206 may be configured to transmit the statement to the client 202. The client 202 may be configured to receive the statement from the delegator 206. The client 202 may be configured to render (e.g., on a user interface for the client 202) the statement, or information or data corresponding to the statement.

The delegator 206 is shown to include a database identifier 212 including a plurality of tenant identifiers 214, a driver selector 216, a request performer 218, a statement generator 220, a cache 222, and a connection pool 224. Generally speaking, the delegator 206 is configured to receive the request to perform a database related action from the client 202. The delegator 206 is configured to identify (e.g., via the database identifier 212) a tenant database 208 corresponding to the request. The delegator 206 is configured to select (e.g., via the driver selector 216) a driver corresponding to the identified tenant database 208. The delegator 206 is configured to perform (e.g., via the request performer 218) the database related action corresponding to the request. The delegator 206 is configured to generate (e.g., via the statement generator 220) a statement including the results of the performance of the database related action. The delegator 206 is discussed in greater detail below. In some embodiments, the delegator 206 may be located on an intermediary device or network device residing intermediary or between the client 202 and server(s) 204. In some embodiments, the delegator 206 may be located on the client-side (e.g., on premises for the client, tenant, or enterprise). In some embodiments, the delegator 206 may be located on the server-side (e.g., on premises for the servers 204).

The delegator 206 may be configured for communicably coupling to the client 202 and/or server(s) 204. The delegator 206 may be configured to form, generate, or otherwise establish the client connection between the client 202 and delegator 206. The delegator 206 may be configured to establish the client connection responsive to receiving the connection request from the client 202. In some embodiments, the client connection may be used for receiving a plurality or series of requests from the client 202.

The client connection between the client 202 and delegator 206 may be any type or form of connection designed or implemented to facilitate exchange, transmission, or receipt of data and signals. In some implementations, the client connection may be within a local area network. Hence, the delegator 206 may reside on the client-side of the system 200. In other implementations, the delegator 206 may reside on the server-side of the system 200, or intermediary between the client 202 and server 204. In some embodiments, the client connection may be a HyperText Transmission Protocol/2 (HTTP/2) connection. The HTTP/2 connection may be designed or implemented to provide for transmission of multiple requests from the client 202 to the delegator 206. For instance, the client 202 may transmit (and the delegator 206 may receive) a series of requests for database related actions by the delegator 206. The delegator 206 may use the HTTP/2 connection for receiving the request(s) from the client 202. The delegator 206 may use the HTTP/2 connection for transmitting a statement including results of the database related actions.

The delegator 206 may be configured to establish and terminate the client connection between the client 202 and delegator 206. The delegator 206 may be configured to establish the client connection when a request for client connection is received from the client 202. The delegator 206 may be configured to terminate the client connection when the client connection is no longer needed. The delegator 206 may be configured to terminate the client connection responsive to execution of each of the database related actions from the request(s). The delegator 206 may be configured to terminate the client connection responsive to terminate the client connection responsive to generating and transmitting a statement including the responses to the request. The delegator 206 may be configured to transmit the statement across the client connection to the client 202. The delegator 206 may terminate the client connection responsive to transmitting the statement to the client 206. The delegator 206 may be configured to close the client connection responsive to receiving close connection request from the client 202 (which may be communicated from the client 202 to the delegator 206 bundled with a request following the last request being sent, responsive to receiving the statement, etc.).

The delegator 206 may be configured to receive a request from the client 202. The delegator 206 may receive the request across or via the client connection established between the client 202 and delegator 206. The request may be a request by the client 202 for the delegator 206 to perform a database related action. Various examples of database related actions may be or include, for instance, database read or write action, a database refresh action, a database updated action, a database comparison action, and so forth. The request may specify various information corresponding to a particular tenant database where the delegator 206 is to execute the request. For instance, the request may specify a query type and a tenant identifier, and a database identifier, as described above. The query type may identify or specify the type of action which is to be performed (e.g., database read or write action, a database refresh action, a database updated action, a database comparison action, etc.). The tenant identifier may be may be a tenant name, a tenant address, a pin or alphanumeric code associated with the tenant, etc. The request may further include a query for execution by the delegator 206. Hence, the request may include a tenant identifier, a query type for a query, and the query itself. The delegator 206 may be configured to identify a particular tenant database for executing the query, as described in greater detail below.

The delegator 206 may include a database identifier 212. The database identifier 212 may be or include any device(s), component(s), module(s), etc. of the delegator 206 designed or implemented to identify a tenant database 208. The database identifier 212 may be configured to identify the tenant database 208 using the tenant identifier included in the request. The database identifier 210 may include or access a plurality of tenant identifiers 214 corresponding to each of the tenants enrolled in the system 200. As such, each of the tenant identifiers 214 may be associated with a particular tenant. The tenant identifiers 214 accessed by the database identifier 210 may be entries of a database. The delegator 206 may be configured to cross-reference the tenant identifier received in the request from the client 202 with the tenant identifiers 214. The delegator 206 may be configured to determine which of the tenant database 208 the particular client 202 is permitted to access based on the cross-referencing of the tenant identifier from the request with the tenant identifiers 214 accessible by the database identifier 212. Hence, the database identifier 212 may be configured to identify each of the tenant database(s) 208 that a particular client 202 may access, which may be a subset of tenant databases 208 within the system 200.

The database identifier 212 may be designed or implemented to identify a particular tenant database 208 from the subset of tenant databases 208 accessible by the client 202. The database identifier 212 may identify the tenant database 208 based on information included in the request. In instances where a user has access to one tenant database 208, the database identifier 212 may identify the tenant database 208 based on the tenant identifier from the request. Hence, the subset of tenant databases 208 which the user is permitted to access may be one tenant database 208. The database identifier 212 may be configured to identify the tenant database 208 based on the database related action. As one example, where the user has read-write access to one tenant database 208, and the request is a database write action, the database identifier 212 may identify the one tenant database 208 which the user is permitted to access. As another example, where the database related action is to pull financial statements from a certain range of years and the tenant maintains one financial database, the database identifier 212 may identify the financial database. The database identifier 212 may be configured to identify the tenant database 208 based on a database identifier included in the request. Similar to the tenant identifier, the database identifier may be a database name, a database address, a pin or alphanumeric code associated with the database, etc. The database identifier 212 may cross-reference the database identifier with the subset of databases for the tenant to identify a particular tenant database 208 corresponding to the request.

The delegator 206 may be configured to establish a database connection between the identified tenant database 208 and delegator 206 for performing the database related action of the request at the tenant database 208. The delegator 206 may establish the database connection using a driver corresponding to the tenant database 208. As shown in FIG. 2, the system 200 may include a plurality of tenant databases 208a-208n. Each of the tenant database(s) 208 may be different (e.g., different types of databases 208, reside on different types of servers 204, etc.). Each of the tenant databases 208 may use have a corresponding driver which is used for establishing the database connection. Since some tenant databases 208 may be different from other tenant databases 208, the respective drivers may be different. According to the implementations described herein, rather than a client using different drivers, the delegator 206 may access a plurality of drivers for various types of tenant databases 208. The delegator 206 may be configured to select a driver based on the type of tenant database 208. The delegator 206 may establish the database connection using the selected driver, as described in greater detail below.

The delegator 206 is shown to include a driver selector 216. The driver selector 216 may be or include any device(s), component(s), module(s), etc. of the delegator 206 designed or implemented to select a driver for the tenant database 208 identified by or via the database identifier 212 (hereinafter referred to as identified tenant database 208). As described in greater detail below, the driver selector 216 may be configured to select the driver based on a determined type for the identified tenant database 208.

The driver selector 216 may include, maintain, or otherwise access a plurality of drivers 218. Each of the drivers 218 may correspond to a respective database type for the corresponding tenant database(s) 208. As some non-limiting examples, the drivers 218 may include Java Database Connectivity (JDBC) drivers, Open Database Connectivity (ODBC) drivers, ADO.NET data provider(s), OLE Database providers, and so forth. These drivers 218 may be designed or implemented to connect, access, and interact with different types of databases. Each of these drivers may be used for accessing a respective database. As such, one driver 218 may access one type of tenant database 208, and another driver 218 may access another type of tenant database 208. In some implementations, as new tenant databases 208 are incorporated into the system 200, corresponding drivers 218 can be communicated, transmitted, downloaded, or otherwise provided to the delegator 206 (e.g., via an administrator, for instance). As such, rather than individual clients 202 receiving drivers for each type of database, the delegator 206 can receive and access a driver 218 every time new tenant databases 208 are incorporated into the system 200.

The driver selector 216 may be configured to select a driver 218 from the plurality of drivers 218 based on the identified tenant database 208. The driver selector 216 may be configured to determine a type of database for the identified tenant database 208. The driver selector 216 may include or access a ledger which includes an identifier for each of the tenant databases 208 and a type of database corresponding thereto. The driver selector 216 may be configured to cross-reference the identifier for the identified tenant database with the ledger to determine a database type for the identified tenant database 208. In some implementations, the driver selector 216 may determine the type of database for the identified tenant database 208 based on data received from the identified tenant database 208. For instance, the driver selector 216 may generate a ping which is sent to the identified tenant database 208. The tenant database 208 may provide a response to the delegator 206. The response may indicate the database type.

The driver selector 216 may be configured to select the driver 218 which corresponds to the identified tenant database 208. The selected driver 218 may be the driver 218 which is configured to provide for or facilitate communication between the delegator 206 and tenant database 208. Once the correct driver 218 is selected by the driver selector 216, the delegator 206 may be configured to perform the database related actions from the request, as described in greater detail below.

The delegator 206 may be configured to generate, form, create, or otherwise establish a database connection using the selected driver 218. The delegator 206 may establish the database connection between the delegator 206 and identified tenant database 208 using the selected driver 218. In some embodiments, the delegator 206 may establish the database connection using the selected driver 218 and other information from the request. For instance, the request may include log-in credentials associated with a user of the client 202, and a connection string. The connection string may be a string corresponding to a connection which would be established between the client 202 and tenant database 208. The delegator 206 may establish the database connection using the selected driver, log-in credentials and a connection string. In this regard, the delegator 206 may impersonate the client 202 in establishing the database connection.

In some implementations, particularly where the delegator 206 establishes a plurality of database connections, the delegator 206 may add the database connection to a connection pool 226. The connection pool 226 may include a plurality of database connections to a plurality of different tenant databases 208. Some of the database connections within the connection pool 226 may be established to different types of tenant databases 208. For instance, some database connections may be to a first type of tenant database 208, some database connections may be to a second type of tenant database 208, and so forth. Each of these database connections may be established using respective drivers 218 selected based on the type of tenant database 208. The delegator 206 may use any of the connections in the connection pool 226 to perform database related actions at the respective tenant databases. The delegator 206 may be configured to label, tag, or otherwise identify the database connections within the connection pool 226 using a database identifier. Subsequently, the delegator 206 may be configured to cross-reference database identifier with the database identifiers in the connection pool 226, and re-use already established database connections.

The delegator 206 may be configured to execute, trigger, or otherwise perform the database related action from the request at the identified tenant database 208. The delegator 206 is shown to include a request performer 220. The request performer 220 may be any device, component, module or script configured to perform the database related action at the identified tenant database 208. The request performer 220 may be configured to identify the database related action from the request. As described above, the database related action may be, for instance, a database read or write action, a database refresh action, a database updated action, a database comparison action, and so forth. The request performer 220 may be configured to perform the database related action by communicating a second request across the database connection. The second request may be a structured request in accordance with the database related action from the request of the client 202. The request performer 220 may be configured to generate the second request in accordance with the selected driver 218. The request performer 220 may transmit the second request across the database connection to the identified tenant database 208.

The delegator 206 may be configured to transmit a response to the client 202 corresponding to the request from the client 202. The delegator 206 is shown to include a statement generator 222. The statement generator 222 may be any device, component, module or script configured to generate a statement to send to the client 202. The statement generator 222 may be configured to receive data from the identified tenant databases 208. The data may be results from the database related actions. For instance, where the database related action is a database read action, the results may be data retrieved from the identified tenant database 208. The statement generator 222 may be configured to compile the data received from the identified tenant database 208. The statement generator 222 may form, build, construct, or otherwise generate a statement corresponding to the compiled data from the identified tenant database 208. The statement may be a compilation of results from the database related actions performed by the delegator 206 (e.g., the request performer 220 of the delegator 206) at the identified tenant database 208. The statement generator 222 may be configured to build the statement for transmitting to the client 202 in response to the request from the client 202.

In some implementations, the delegator 206 may be configured to store various table metadata corresponding to the tenant database 208 for subsequent use. For instance, the delegator 206 may be configured to store a structure or format of the tenant database 208. The delegator 206 may store the table metadata corresponding to the tenant database 208 in cache 224. The delegator 206 may store the table metadata in cache 224 so that the delegator 206 can subsequently use the table metadata for generating requests/processing results. For instance, the request performer 220 may use the table metadata in cache 224 for generating a request in accordance with a structure or format of the tenant database 208. Similarly, the statement generator 222 may be configured to use the table metadata in cache 224 for interpreting the data received from the tenant database 208 responsive to the request from the request performer 220. The delegator 206 may be configured to store the table metadata indefinitely, until the database connection times out (e.g., closes, ends, etc., whether automatically, responsive to completion of all requests, and so forth), or until the table structure or format is modified. In each of these embodiments, the delegator 206 may store the table metadata in cache 224 for subsequently using the table metadata.

Figure 3:
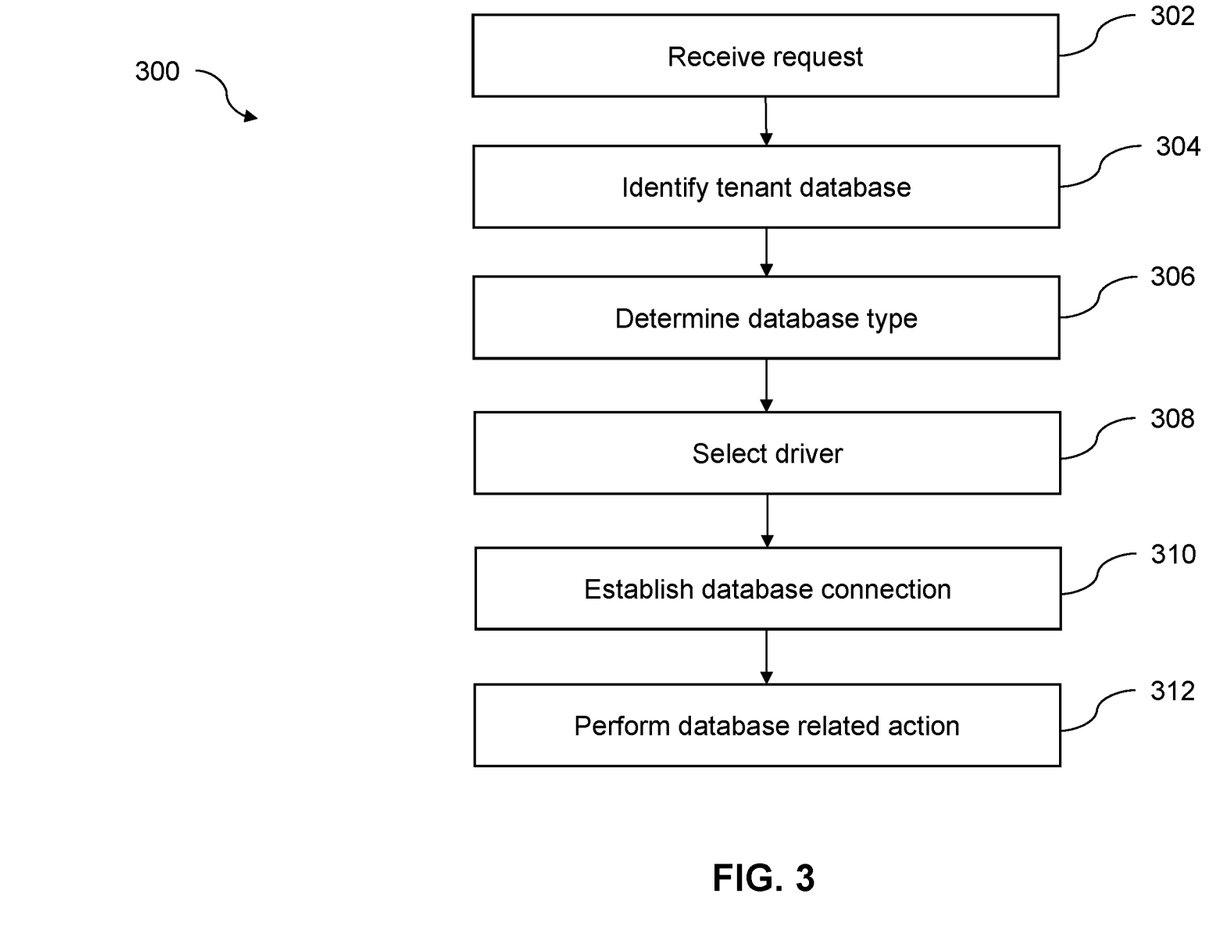
FIG. 3 is a flow diagram for a method for block diagram of a system 200 for providing heterogeneous access to a plurality of tenant databases of different types.

Referring now to FIG. 3, depicted is a flow diagram for a method 300 for providing access to tenant databases, according to an illustrative embodiment. The functionalities of method 300 may be implemented using, or performed by, the components described in FIGS. 1-2, such as the client(s) 202, the server 204, the delegator 206, etc. In brief overview, a delegator receives a request (302). The delegator identifies a tenant database (304). The delegator determines a database type (306). The delegator selects a driver (308). The delegator establishes a database connection (310). The delegator performs a database related action (312).

At operation (302), a delegator receives a request. In some embodiments, the delegator receives a request to perform a database related action. The delegator may be arranged intermediary to a plurality of clients and a plurality of tenant databases. The delegator may receive the request from a client of the plurality of clients. The request may identify a query type and a tenant identifier. The plurality of tenant databases may include one or more first tenant databases of a first database type and one or more second tenant databases of a second database type.

The request may be a request to perform database related actions at the tenant database by the delegator. The request may be a query for the tenant database. In some embodiments, the database related action may be retrieving information from a tenant database. In some embodiments, the database related action may be writing information to the tenant database. In some embodiments, the database related action may be commands for the server corresponding to the databases to perform various information (e.g., commands to refresh a particular database, update a particular database, compare entries of two or more databases, etc.).

In some embodiments, the request may include various information corresponding to the tenant database(s), the client, the tenant corresponding to the client, etc. In some embodiments, the request includes a query type and a tenant identifier. The query type may be or include a type of database related action to perform (e.g., a database read or write action, a database refresh action, a database updated action, a database comparison action, etc.). The tenant identifier may identify which tenant corresponds to the client generating the request. The tenant identifier may be a tenant name, a tenant address, a pin or alphanumeric code associated with the tenant, etc. In some embodiments, the request includes a connection identifier. The connection identifier may be or include an alphanumeric code or string which is associated with the client connection between the client and delegator. The request may include a database identifier. The database identifier may be a database name or title, pin, address, alphanumeric code, etc. associated with a particular database.

In some embodiments, the request includes a query. The query may be a structured query in accordance with a Structured Query Language (SQL). In some embodiments, the client may include or access a delegator driver. The delegator driver may specify a structure for SQL requests. The delegator driver may receive commands or prompts from other components of the client. The delegator driver may translate, transform, or otherwise convert the commands into SQLs which are received and interpretable by the delegator.

In some embodiments, the delegator may establish a client connection between the delegator and the client. The delegator may establish the client connection responsive to receiving a connection request from the client. The delegator may receive the request to perform the database related action via the client connection. The client connection between the client and delegator may be any type or form of connection designed or implemented to facilitate exchange, transmission, or receipt of data and signals. In some embodiments, the client connection may be a HyperText Transmission Protocol/2 (HTTP/2) connection. The HTTP/2 connection may provide for transmission of multiple requests from the client to the delegator. For instance, the client may transmit (and the delegator may receive) a series of requests for database related actions by the delegator. The delegator may use the HTTP/2 connection for receiving the request(s) from the client. The delegator may use the HTTP/2 connection for transmitting a statement including results of the database related actions performed by the delegator on behalf of the client at the identified tenant database.

The delegator may terminate the client connection. The delegator may terminate the client connection responsive to execution of each of the database related actions from the request(s). As described in greater detail below, the delegator may transmit a statement including responses to the queries from the request across the client connection to the client. The delegator may terminate the client connection responsive to transmitting the statement to the client. The delegator may terminate the client connection responsive to receiving terminate connection request from the client (which may be communicated from the client to the delegator bundled with the last request being sent, responsive to receiving the statement, etc.).

In some embodiments, the identified database is a first tenant database having the first database type. The request may be a request for connection to the first tenant database and a second tenant database having the second database type. In this regard, the request may request to perform database related actions at two different tenant databases which are different types of databases. As described in greater detail below, the delegator may establish database connections at both tenant databases for performing database related actions at the respective tenant databases. The database connections may be a part of a connection pool for the delegator.

At operation (304), the delegator identifies a tenant database. In some embodiments, the delegator identifies the tenant database for transmitting a second request to the tenant database. The delegator may identify the tenant database using the tenant identifier included in the request. The delegator may include or access a plurality of tenant identifiers corresponding to each of the tenants enrolled in the system. As such, each of the tenant identifiers may be associated with a particular tenant. The delegator may maintain a database including a plurality of tenant identifiers and corresponding tenant database(s) which are associated with the tenant. The delegator may cross-reference the tenant identifier received in the request from the client with the tenant identifiers. The delegator may determine which of the tenant database the particular client is permitted to access based on the cross-referencing of the tenant identifier from the request with the tenant identifiers accessible by the database identifier. Hence, the delegator may identify each of the tenant database(s) that a particular client may access, which may be a subset of tenant databases.

The delegator may identify a particular tenant database from the subset of tenant databases accessible by the client. The delegator may identify the tenant database based on information included in the request. In instances where a user has access to one tenant database, the delegator may identify the tenant database based on the tenant identifier from the request. Hence, the subset of tenant databases which the user is permitted to access may be one tenant database. The delegator may identify the tenant database based on the database related action. As one example, where the user has read-write access to one tenant database, and the request is a database write action, the delegator may identify the one tenant database which the user is permitted to access and perform write actions. As another example, where the database related action is to pull financial statements from a certain range of years and the tenant maintains one financial database, the delegator may identify the financial database. The delegator may identify the tenant database 208 based on a database identifier included in the request. Similar to the tenant identifier, the database identifier may be a database name, a database address, a pin or alphanumeric code associated with the database, etc. The delegator may cross-reference the database identifier with the subset of databases for the tenant to identify a particular tenant database corresponding to the request.

At operation (306), the delegator determines a database type. In some embodiments, the delegator determines a database type corresponding to the identified tenant database. The delegator may include or access a ledger which includes an identifier for each of the tenant databases and a type of database corresponding thereto. The delegator may cross-reference the identifier for the identified tenant database with the ledger to determine a database type for the identified tenant database. In some implementations, the delegator may determine the type of database for the identified tenant database based on data received from the identified tenant database. For instance, the delegator may generate a ping which is sent to the identified tenant database. The delegator may provide a response to the delegator. The response may indicate the database type.

At operation (308), the delegator selects a driver. In some embodiments, the delegator selects a driver based on the identified database type for the identified tenant database. The delegator may select the driver from a plurality of drivers corresponding to respective database types. The delegator may include, maintain, or otherwise access a plurality of drivers. Each of the drivers may correspond to a respective database type for the corresponding tenant database(s). These drivers may connect, access, and interact with different types of databases. Each of these drivers may be used for accessing a respective database. As such, one driver may access one type of tenant database, and another driver may access another type of tenant database. In some implementations, as new tenant databases are incorporated into the system, corresponding drivers can be communicated, transmitted, downloaded, or otherwise provided to the delegator (e.g., via an administrator, for instance).

The driver selector may select the driver which corresponds to the identified tenant database. The selected driver may be the driver which is configured to provide for or facilitate communication between the delegator and tenant database. Once the correct driver is selected by the driver selector, the delegator may perform the database related actions from the request, as described in greater detail below.

At operation (310), the delegator establishes a database connection. In some embodiments, the delegator may establish the database connection between the delegator and identified database. The delegator may establish the database connection using the selected driver. The delegator may establish the database connection for performing the database related action of the request. In some embodiments, the delegator may establish the database connection using the selected driver and other information from the request. For instance, the request may include log-in credentials associated with a user of the client, and a connection string. The connection string may be a string corresponding to a connection which would be established between the client and tenant database. The delegator may establish the database connection using the selected driver, log-in credentials and a connection string. In this regard, the delegator may impersonate the client in establishing the database connection.

In some embodiments, the delegator establishes a second database connection between the delegator and a second tenant database using a second driver corresponding to the second database type for the second tenant database. The delegator may establish, form, or generate a connection pool, including the first database connection and second database connection, between the delegator and the plurality of databases.

At operation (312). the delegator performs a database related action. In some embodiments, the database related action is a query. The delegator may execute the query to retrieve data from the identified database. The delegator may execute the query using the database connection. The delegator may generate a statement based on the retrieved data. The delegator may transmit the statement corresponding to the query to the client.

The delegator may execute, trigger, or otherwise perform the database related action from the request at the identified tenant database. The delegator may identify the database related action from the request. As described above, the database related action may be, for instance, a database read or write action, a database refresh action, a database updated action, a database comparison action, and so forth. The delegator may perform the database related action by communicating a second request across the database connection. The second request may be a structured request in accordance with the database related action from the request of the client. The delegator may generate the second request in accordance with the selected driver 218. The delegator may transmit the second request across the database connection to the identified tenant database.

The delegator may transmit a response to the client corresponding to the request from the client. The delegator may receive data from the identified tenant databases. The data may be results from the database related actions. For instance, where the database related action is a database read action, the results may be data retrieved from the identified tenant database. The delegator may compile the data received from the identified tenant database. The delegator may form, build, construct, or otherwise generate a statement corresponding to the compiled data from the identified tenant database. The statement may be a compilation of results from the database related actions performed by the delegator at the identified tenant database. The delegator may build the statement for transmitting to the client in response to the request from the client.

In some implementations, the delegator may store various table metadata corresponding to the tenant database for subsequent use. For instance, the delegator may store a structure or format of the tenant database. The delegator may store the table metadata corresponding to the tenant database in cache. The delegator may store the table metadata in cache so that the delegator can subsequently use the table metadata for generating requests/processing results. The delegator may store the table metadata indefinitely, until the database connection times out (e.g., closes, ends, etc., whether automatically, responsive to completion of all requests, and so forth), or until the table structure or format is modified. In each of these embodiments, the delegator may store the table metadata in cache for subsequently using the table metadata.

It should be understood that the systems described above may provide multiple ones of any or each of those components and these components may be provided on either a standalone machine or, in some embodiments, on multiple machines in a distributed system. The systems and methods described above may be implemented as a method, apparatus or article of manufacture using programming and/or engineering techniques to produce software, firmware, hardware, or any combination thereof. In addition, the systems and methods described above may be provided as one or more computer-readable programs embodied on or in one or more articles of manufacture. The term "article of manufacture" as used herein is intended to encompass code or logic accessible from and embedded in one or more computer-readable devices, firmware, programmable logic, memory devices (e.g., EEPROMs, ROMs, PROMs, RAMs, SRAMs, etc.), hardware (e.g., integrated circuit chip, Field Programmable Gate Array (FPGA), Application Specific Integrated Circuit (ASIC), etc.), electronic devices, a computer readable non-volatile storage unit (e.g., CD-ROM, USB Flash memory, hard disk drive, etc.). The article of manufacture may be accessible from a file server providing access to the computer-readable programs via a network transmission line, wireless transmission media, signals propagating through space, radio waves, infrared signals, etc. The article of manufacture may be a flash memory card or a magnetic tape. The article of manufacture includes hardware logic as well as software or programmable code embedded in a computer readable medium that is executed by a processor. In general, the computer-readable programs may be implemented in any programming language, such as LISP, PERL, C, C++, C#, PROLOG, or in any byte code language such as JAVA. The software programs may be stored on or in one or more articles of manufacture as object code.

While various embodiments of the methods and systems have been described, these embodiments are illustrative and in no way limit the scope of the described methods or systems. Those having skill in the relevant art can effect changes to form and details of the described methods and systems without departing from the broadest scope of the described methods and systems. Thus, the scope of the methods and systems described herein should not be limited by any of the illustrative embodiments and should be defined in accordance with the accompanying claims and their equivalents.

What is claimed is:

1. A method for providing heterogeneous access to a plurality of tenant databases of different types, the method comprising:
   receiving, by a delegator intermediary to a plurality of clients and a plurality of tenant databases, from a client of the plurality of clients, a first request to perform a database related action, the first request received from the client via a first driver and including a tenant identifier, the plurality of tenant databases including one or more first tenant databases of a first database type and one or more second tenant databases of a second database type, the first driver configured to establish a connection between the client and the delegator;
   identifying, by the delegator, using the tenant identifier included in the first request, a tenant database for transmitting a second request to the tenant database generated by the delegator based on the first request;
   determining, by the delegator, a database type corresponding to the identified tenant database;
   selecting, from a plurality of drivers corresponding to respective database types, a second driver for establishing a database connection with the identified tenant database based on the database type for the identified tenant database, each second driver configured to establish connections between the delegator and databases having the respective database type to which the second driver corresponds; and
   establishing, by the delegator using the selected driver, the database connection between the delegator and the identified tenant database for performing the database related action of the first request using the second request.

2. The method of claim 1, wherein the database related action includes a query for execution, and wherein the method further comprises:
   executing, by the delegator using the database connection, the query to retrieve data from the identified database;
   generating, by the delegator, a statement based on the retrieved data; and
   transmitting, from the delegator to the client, the statement corresponding to the query.

3. The method of claim 1, further comprising:
   storing, by the delegator, table metadata corresponding to the identified database in a cache maintained by the delegator.

4. The method of claim 3, wherein the delegator stores the table metadata in the cache until expiration of the database connection or alteration to a structure of a table corresponding to the table metadata.

5. The method of claim 1, further comprising:
   establishing, between the delegator and the client, a client connection responsive to receiving a connection request from the client, wherein the request to perform the database related action is received via the client connection.

6. The method of claim 5, wherein the database related action of the request is one of a plurality of database related actions of the request, and wherein the method further comprises:
   terminating, by the delegator, the client connection responsive to execution of each of the plurality of database related actions.

7. The method of claim 5, wherein the client connection is a HyperText Transmission Protocol/2 (HTTP/2) connection via which the delegator receives a plurality of requests including the request.

8. The method of claim 1, wherein the delegator establishes the database connection between the delegator and the identified tenant database for performing the database related action of the request using the selected driver, log-in credentials associated with a user of the client, and a connection string from the request.

9. The method of claim 1, wherein the identified database is a first tenant database having the first database type, and the request is a request for connection to the first tenant database and to a second tenant database having the second database type.

10. The method of claim 9, wherein the database connection is a first database connection, and wherein the method further comprises:
    establishing, by the delegator, a second database connection between the delegator and the second tenant database using a second driver corresponding to the second database type for the second tenant database, the first database connection and second database connection being connections within a connection pool between the delegator and the plurality of databases.

11. A system for providing heterogeneous access to a plurality of tenant databases of different types, the system comprising:
    a delegator arranged intermediary to a plurality of clients and a plurality of database servers configured to be communicably coupled to the plurality of clients and the plurality of servers, the delegator comprising one or more hardware processors and memory, the delegator configured to:
        receive, from a client of the plurality of clients, a request to perform a database related action, the first request received from the client via a delegator driver and including a tenant identifier, the plurality of tenant databases including one or more first tenant databases of a first database type and one or more second tenant databases of a second database type;
        identify, by the delegator, using the tenant identifier included in the first request, a tenant database for transmitting a second request to the tenant database generated by the delegator based on the first request and having a second query type;
        determine, by the delegator, a database type corresponding to the identified tenant database;
        select, from a plurality of drivers corresponding to respective database types, a driver for establishing a database connection with the identified tenant database based on the database type for the identified tenant database, each second driver configured to establish connections between the delegator and databases having the respective database type to which the second driver corresponds; and establish, by the delegator using the selected driver, a database connection between the delegator and the identified tenant database for performing the database related action of the first request using the second request.

12. The system of claim 11, wherein the database related action includes a query for execution, and wherein the delegator is further configured to:
   execute, using the database connection, the query to retrieve data from the identified database;
   generate a statement based on the retrieved data; and
   transmit, from the delegator to the client, the statement corresponding to the query.

13. The system of claim 11, wherein the delegator is further configured to:
   store table metadata corresponding to the identified database in a cache maintained by the delegator.

14. The system of claim 13, wherein the delegator stores the table metadata in the cache until expiration of the database connection or alteration to a structure of a table corresponding to the table metadata.

15. The system of claim 11, wherein the delegator is further configured to:
   establish, between the delegator and the client, a client connection responsive to receiving a connection request from the client, wherein the request to perform the database related action is received via the client connection.

16. The system of claim 15, wherein the database related action of the request is one of a plurality of database related actions of the request, and wherein the delegator is further configured to:
   terminate the client connection responsive to execution of each of the plurality of database related actions.

17. The system of claim 15, wherein the client connection is a HyperText Transmission Protocol/2 (HTTP/2) connection via which the delegator receives a plurality of requests including the request.

18. The system of claim 11, wherein the delegator establishes the database connection between the delegator and the identified tenant database for performing the database related action of the request using the selected driver, log-in credentials associated with a user of the client, and a connection string from the request.

19. The system of claim 11, wherein the identified database is a first tenant database having the first database type, and the request is a request for connection to the first tenant database and to a second tenant database having the second database type.

20. The system of claim 19, wherein the database connection is a first database connection, and wherein the delegator is further configured to:
   establish a second database connection between the delegator and the second tenant database using a second driver corresponding to the second database type for the second tenant database, the first database connection and second database connection being connections within a connection pool between the delegator and the plurality of databases.

\* \* \* \* \*